United States Patent [19]
Harvey

[11] Patent Number: 5,863,638
[45] Date of Patent: Jan. 26, 1999

[54] METHOD FOR BONDING ARTISTS' MATERIALS TO COATED ARCHITECTURAL PANELS AND ARTICLE FOR USE IN, AND PRODUCED BY THE METHOD

[76] Inventor: Julie Harvey, 41 Fifth Ave. #9B, New York, N.Y. 10003

[21] Appl. No.: 599,432

[22] Filed: Jan. 17, 1996

[51] Int. Cl.⁶ .......................... B32B 15/08; B32B 15/20; B32B 27/08; B32B 27/36
[52] U.S. Cl. .......................... 428/195; 428/201; 428/204; 428/206; 428/209; 428/421; 428/458; 427/11; 427/197; 427/202; 427/290; 427/307; 427/322; 427/372.2; 427/374.1; 427/384; 427/388.1; 427/388.4; 427/398.1; 427/407.7; 427/404; 427/412.4; 427/412.5
[58] Field of Search .......................... 428/195, 201, 428/203, 204, 206, 209, 421, 422, 457, 458; 427/11, 197, 202, 203, 289, 290, 299, 307, 322, 372.2, 375, 384, 385.5, 386, 388.1, 388.2, 388.4, 398.1, 409, 410, 412.5

[56] References Cited

U.S. PATENT DOCUMENTS

| | | | |
|---|---|---|---|
| 3,767,521 | 10/1973 | Glaser et al. | 161/216 |
| 4,042,539 | 8/1977 | Fanning | 260/16 |
| 4,369,222 | 1/1983 | Hedrick e al. | 428/216 |
| 4,424,254 | 1/1984 | Hedrick et al. | 428/215 |
| 4,614,683 | 9/1986 | Barsotti | 428/220 |
| 5,609,918 | 3/1997 | Yamaguchi et al. | 427/407.1 |

*Primary Examiner*—Vivian Chen
*Attorney, Agent, or Firm*—Abelman, Frayne & Schwab

[57] ABSTRACT

Composite architectural panels comprising a substrate composed of a laminate of two metal sheets joined by a thermoplastic core and having a factory-applied polymeric surface coating which is not receptive to artists' materials, are prepared for use as a support or substrate for traditional artists' materials by roughening the surface using abrasive and/or chemical means. After thoroughly cleaning the prepared surface, one or more artists' materials are applied and permanently bonded to the panel surface by heating the panel substrate to a temperature which is less than the melting temperature of the thermoplastic core and maintaining the substrate at that temperature for a time that is sufficient to bond the artists' materials to the surface.

11 Claims, No Drawings

METHOD FOR BONDING ARTISTS' MATERIALS TO COATED ARCHITECTURAL PANELS AND ARTICLE FOR USE IN, AND PRODUCED BY THE METHOD

FIELD OF THE INVENTION

The invention relates to new rigid supports or substrates to which traditional artists' materials are applied and permanently bonded.

BACKGROUND OF THE INVENTION

Artists have traditionally used supports or substrates such as canvas, wood panels, and paper for paintings and drawings. These materials are fragile, flexible and susceptible to atmospheric changes which can cause expansion of the support material. Over time, these inherent properties can cause cracking, warping, and loss of integrity of the substrate and/or the artist's materials applied to the substrate.

Artists have long sought other materials for use as a substrate or support for the application of traditional media that would avoid these problems and provide a permanent and rigid substrate to which various artists' materials can be applied.

To be suitable for use by artists working in such diverse materials as pencil, charcoal, pastels, inks and paints, the substrate must accept and retain the medium in a manner similar to canvas or paper, must permit the artist to modify and/or remove the medium from the surface of the substrate during development of the-work, and most importantly, the final work must adhere permanently to the substrate.

Prefinished exterior architectural panels have been developed that possess several characteristics that would make them desirable for use as a substrate or support for the application of artists' materials. Having been developed for use in exterior building construction, architectural panels are rigid and dimensionally stable; their polymeric finishes have the advantage of sunlight and weather resistance and can be considered permanent as compared to the traditional artists' substrates. However, such prefinished architectural panels suffer the drawback of having shiny, slick finishes that are impervious to essentially all artists' materials. It has also been found that for those few classes of artists' materials that can be applied to the prefinished panels, almost all can be readily removed by wiping or light scraping, as with the fingernail.

Another important consideration is the ability to cut the architectural panels to the size desired. Panels having factory applied finishes must be able to be cut and shaped with conventional hand tools or small power tools that are available to the artist. The finish should not crack or separate along cutting lines. Also, of importance is the weight or gage of the metal to which the finish is applied. Since the architectural panels may only be available from the manufacturer in certain specified large sizes, the materials of fabrication should be relatively light in weight so that the panels can be moved and worked by the artist without special equipment. Especially hardened metal panels that require specialized tools and/or equipment for cutting and shaping would not be useful.

A class of prefinished architectural panels that has been found to have many desirable characteristics are composites comprising two or more metal sheets with a thermoplastic core between the sheets. Of particular utility are prefinished architectural panels comprising two sheets or webs of aluminum having between them, and bonded together by, a thermoplastic core. This aluminum composite has the advantages of being relatively light in weight, and adapted for cutting and shaping with conventional hand tools, such as saws and files, and with small power tools. Such aluminum composite panels can also be bent and rolled to assume curvilinear shapes using conventional methods and tools.

The finishes applied to exterior architectural panels must be suitable for the practice of the invention. The finishes must be hard, but be susceptible to being dulled or roughened in preparation of the surface for application of the artists' materials. Suitable finishes are found among polymeric materials. It has been found that finishes of particular utility are selected from the group consisting of polyester and fluorocarbon coatings.

Both the polyester and fluorocarbon finishes are manufactured with smooth monolithic surfaces and are available in colors and a variety of gloss levels. This slick non-porous surface is not at all receptive to the direct application of artists' grade materials by hand. The impervious surface coating is resistant to bonding with artists materials such as paints and pastels which, in practice, also prove difficult to manipulate. Wet paint materials tend to "bead up" and fail to adhere properly, while most drawing mediums glide over the surface without marking. Some paints, such as artists' oils and enamels, can be made to bond to the factory finished coating surface by heating the panel to which the paint has been applied.

BRIEF DESCRIPTION OF THE INVENTION

What has been found is that with appropriate preparation of the surface of the coating, and subsequent processing steps, the architectural panels described serve as excellent substrates for the application of a wide variety of traditional artists' materials. After the surface is prepared, as for example, by a gentle sanding, artists materials can be applied and manipulated with ease. Pastels can be made to flow and are blended easily, and paints can be applied directly to the surface and be permanently bonded to it.

While with the untreated coating, paint could be easily scratched off, as by a fingernail, after treatment with the process of the invention, artists materials are applied and manipulated with ease and are bonded permanently. The surface coating of the architectural panels is physically altered from a hard and shiny industrial surface to what appears as a milky smooth earthenware surface. A once difficult and stubborn material is converted into a new medium having an unlimited spectrum of possibilities for use by artists and artisans.

Architectural panels meeting the above description are commercially available form Mitsubishi Chemical America, Inc. located in Chesapeake, Va. 23320, and are sold under the trademark ALPOLIC. Composite panels are also available from Reynolds Aluminum Company of Eastman, Georgia under the trademark REYNO-BOND. A similar product is sold under the trademark ALUCOBOND by Alusingen GmbH of Germany. The composite sheets are available in different thicknesses ranging from about 3 mm to about 6 mm. The weight and rigidity increase with the relative thickness, but the material can be readily cut and worked with conventional tools In its broadest terms, the invention comprehends a method of permanently applying one or more artists' materials to the surface coating of a metal composite substrate having a thermoplastic core, the surface coating selected from the group consisting of polyester and fluorocarbon coatings, the method comprising the steps of a. roughening the surface coating of the substrate to which the one or more artists' materials is to be applied;

b. cleaning the roughened surface coating to remove dirt and oil;

c. applying the one or more artists' materials to the roughened surface coating;

d. heating the composite substrate to which the one or more artists' materials has been applied to a temperature which is less than the melting temperature of the thermoplastic core and maintaining the substrate at that temperature for a time that is sufficient to bond the one or more artists' materials to the coating; and e. cooling the composite substrate.

The invention is also directed to a novel article of manufacture adapted for use as a support to receive one or more artists' materials that are permanently bonded to an outer surface of the support, the article comprising a thermoplastic core and a surface coating selected from the group consisting of polyester and fluorocarbon coatings, which surface coating has been roughened and then cleaned to remove dirt and oily residues. In a preferred embodiment, the prepared surface coating is covered with a protective film or sheet that is removed only when the article is to be used.

A further embodiment of the invention is an article of manufacture comprising a metal substrate containing at least two sheets or webs of metal bonded to and separated by a thermoplastic core, a roughened surface coating on one of the metal sheets or webs, the surface coating selected from the group consisting of polyester and fluorocarbon coatings, and one or more artists' materials that have been heat-bonded to the surface coating by heating the substrate to a temperature sufficient to cause the one or more artists' materials to bond to the coating where the temperature does not exceed the melting temperature of the thermoplastic core.

DETAILED DESCRIPTION OF THE INVENTION

The following is a step-wise description of the invention which is intended for practice on individual panels sized for a particular artists' work, but is also applicable for commercial or even industrial-scale production, i.e., by the manufacturer of the panels.

1. Modification of the Coating Surface

The normally high gloss finish of the substrate coating is dulled or roughened superficially. The coating can be roughened or dulled using mechanical means or chemical agents. Using one or more abrasive materials, the surface is rubbed until is assumes a chalk-like or powdery appearance. For example, a wet or dry sandpaper having a grit of #220 or finer can be used. Steel wool and scouring pads can also be used, either alone or in combination with other hand or mechanical abrasive materials. Abrasive powders, such as pumice and household cleansers can also be employed, either alone or in combination with other roughening agents. The roughening can be accomplished manually, as by hand sanding, or using power tools, such as electric palm sanders. If the surface to be prepared is of a large area, on an industrial or commercial scale, sand blasting techniques and other production type equipment and methods can be employed.

The following abrasives can be used to roughen the coated surface of the substrate, alone or in combination:

pumice, pumice-stone, quartz sand, rotten stone, ferric oxide, garnet, crocus, corundum, colothar, silicon carbide, aluminum oxide, sand paper, emery paper, scouring pads, steel wool, nonwoven cleaning and sanding pads, household cleansers and polishing compounds.

The surface to which the artists' materials are to be applied should be uniform in appearance following the dulling or roughening step. This treatment of the coating is superficial, i.e., the polyester or fluorocarbon coating is not to be removed down to the metal substrate. The treated surface should have an overall matte appearance. Several steps, using different types of abrasive and/or chemical treatment can be employed to achieve the desired finish on the surface of the coating.

The surface of the panel can be chemically etched or dulled to remove the shiny gloss finish. Acids, including hydrochloric, muriatic, sulfuric and nitric, selenious acid, and strong caustics, such as sodium hydroxide, which will etch or roughen the surface coatings are applied for a sufficient time to produce the desired matte finish. The time required will depend upon a number of factors, including the specific coating and concentration of the chemical(s) employed., Chemical treatment should avoid contact with the aluminum and thermoplastic substrate. A mixture of phosphoric and chromic acids, sold under the trademark METAL TREAT by Klean Strip, Inc. a division of W M Barr, Inc., has been found to be useful. Another useful material for chemically preparing the surface is a mixture of toluene, methanol, acetone, naptha and isopropanol sold under the trademark WILL BOND.

2. Surface Cleaning

Dust, dirt and oily residues are removed from the prepared surface. Soap, detergents and other water soluble cleaning agents can be used, as well as solvents, such as alcohol, which do not leave a residue. The cleaned panels are dried thoroughly before use.

In order to protect the panels until they are ready for use, or for shipment and distribution, they are covered with a plastic film, or a plastic-coated paper, such as a polyethylene coated wrapping paper. The protective film must leave no adhesive or other residue when removed from the panel.

When the coating surface has been appropriately prepared and covered with a protective film or web, the larger panels can be cut into smaller sizes for retail sale at the point of manufacture, or by distributors or retailers. Any burrs or other tool marks along cut edges should be removed with a file or grinder as required to provide a smooth edge.

Panels can be advantageously inventoried with their protective films in the customary sizes that stretched canvases are sold in artists' supply stores.

3. Application of Artists' Materials

The prepared surface of the coated substrate can serve as a support to which essentially all conventional artists' materials can be applied. Artists' materials which can be applied to, and manipulated or worked while on the surface of the prepared coating can include the following: pencil, colored pencils, graphite, charcoal, chalk, pastels, ballpoint pen, water color pencils, ink, felt-tipped markers, oil pastels and oil stick crayons.

A wide variety of paints can also be applied to the prepared surface of the substrate coating. As used herein, the term "paint" is intended to include the following: artists' oil colors (being pigments in linseed oil), enamels, lacquers, gouache, acrylic resins and emulsions, tempera paints, egg tempera paints, casien-based paints, other synthetic resins, water colors, inks, polyurethane and epoxy paints and spray paints of various types sold in aerosol containers or applied by airbrushing or other air pressured or airless spray methods.

As can be seen from the above list, the broad category of paint includes both water-based materials and oil and solvent based products of both the natural and synthetic type. These materials can be applied using conventional brush and pallet knife methods, or by spraying.

In the case of pencil drawings, or works rendered in charcoal, pastels and the like, a conventional sealant must be applied to prevent smudging or removal of the dry medium from the surface of the substrate coating. Typical sealants which are useful in the practice of this aspect of the invention include water-based acrylic mediums, a solution of a drying oil and a solvent, and the like. These sealant materials are applied in an even coat, preferably by spraying, covering the entire surface of the panel.

4. Heat Bonding

The completed panel to which the artists' material(s) have been applied, and any sealant or glaze that was applied, must be heated to permanently bond the artists' material to the surface of the coated substrate. The panel is heated to a temperature ranging from 190° F. to 350° F. At the lower temperature of 190° F., the panel should be heated for about two to three hours; at the higher temperature of 350° F., the heat treatment step is effected within about 30 minutes. At intermediate temperatures, the heating time will vary accordingly, i.e., the higher the temperature, the less time is required. Different artists' materials can require more or less time at a given temperature; the time and temperature can readily be determined by test samples. The particular time and temperature to be used is that at which all materials that have been applied to a substrate are bonded to the particular panel coating.

As will be appreciated by one of ordinary skill in the art, artist' materials and their methods of use and application are limited only by the imagination of the artist. The essential steps in the preparation of this novel support are (1) the superficial and uniform dulling or roughening of the polyester or fluorocarbon coating on the metallic substrate containing a thermoplastic core; (2) the cleaning of the prepared surface of the coating; and, optionally, (3) the application of a protective film or covering to the prepared surface until its eventual use. Following application of one or more conventional artists' materials to the prepared surface of the coating, the method of the invention includes the further step of heating the panel to a temperature ranging from about 190° F. to about 350° F., which temperature does not exceed the melting temperature of the thermoplastic core of the substrate, and for a time that is sufficient to bond the artists' materials to the coating.

The invention can be practiced employing the artists' materials identified above. As one of ordinary skill in the art will understand, there are also numerous classes of auxiliary materials employed by artists and artisans in preparing artists' materials, in applying them to the surface or substrate, in building up layers of the same or different materials, and in providing protective or finish coatings on the final work.

These auxiliary materials include adhesives, solvents and thinners, driers, varnishes, resins and the like. The following exemplifies the types of materials falling within these classes that are useful in practicing the invention.

A. Adhesives

The following materials traditionally included in the classification of adhesives can be used in the practice of the invention:

gelatin
acrylic Resins
acrylic Emulsions
drying Oils
albumen
ox Gall
cherry gum
gum Arabic
gum kordofan
gum Senegal
gum tragacanth
white senaar gum
gum Turkey
parchment Size
fish glue
isinglass
casein
dextrin/starches
flour paste
animal glues, such as rabbitskin glue, cologne glue and calfskin glue
water glass
mordants

B. Varnishes

The following materials, generally classified as "varnishes", can be used as a single or in multiple layers in practicing the invention:

dammar
mastic
shellac
copal
synthetic resins
alkyd
chlorinated rubber
vinyl
balsams
copaiba balsam
strasbourg turpentine
venice turpentine
cellulose nitrate
cellulose acetate
viscose (cellulose) and 4% formaldehyde solution C. Solvents and Thinners The following solvents and thinners can be used in preparing and applying the artists' materials for use in practicing the invention:

turpentine turpenoid livos citrus thinner petroleum products (mineral spirits, kerosene, benzene, naphtha, chlorinated hydrocarbons)

alcohol ketones (acetone, etc.)

water flow medium (acrylic)

soap

D. Resins

1. Natural

The following naturally-derived resinous materials can be used alone, or in combination with artists' materials in the practice of the invention:

amber resin colophony copal or Congo copal, or manilla dragon's blood benzoin elemi kauri lacquer lac/shellac oleoresin rosin Sandarac resin sarcocolla resin Zanzibar copal 2. Synthetic The following synthetic resins can be used in the practice of the invention:

acrylic emulsion paints (acrylic polymer tempera)

acrylic resins vinyl resins alkyd resins cellulose nitrate cellulose acetate polyvinyl acetate emulsions styrene resin and chlorinated rubber.

E. Drying Oils

The following naturally-derived drying oils can be used alone or in combination with solvents and/or artists' materials:

linseed oil poppy-seed oil safflower oil soya oil tung oil walnut oil candlenut oil perilla oil sunflower oil hempseed oil F. Metal Driers The following metal soaps and/or salts can be used in the invention to accelerate the drying of the materials:

lead drier

Japan drier manganese drier cobalt linoleate drier

G. Protective Sealants acrylic resins oils (natural drying)

enamel egg tempera casein chlorinated rubber expoxy-based coatings polyurethane coatings H. Metal Foil Overlays The following metal foils can be permanently applied to the surface using appropriate adhesives or bonders and customary protective coatings, if desired:

gold leaf composition leaf silver leaf palladium aluminum copper brass

Although the above listings of materials in the various classes is intended to be comprehensive as illustrative of the scope of the invention, they are not to be read as limiting.

The following examples are intended to be illustrative of the invention. In these examples, a composite metal substrate manufactured by Mitsubishi Chemical America and sold under the trademark ALPOLIC was used. Each of the outer surface of the aluminum sheet comprising the substrate is coated with either a polyester ("PE") or a fluorocarbon ("FC") coating. The coatings come in a variety of colors which are uniform throughout the coating layer.

In these examples, the panels were placed on racks in either a gas or an electric oven that was pre-heated to the specified temperature. After heating for the specified time, the panels were removed from the oven and placed on horizontal racks and allowed to cool under ambient conditions to room temperature.

EXAMPLE I

Preparing Panels—Cutting Sanding and Cleaning

The large Alpolic PE and FC panels were cut into the desired sizes and shapes. A table saw was used for straight cuts and a jig saw (saber saw) for curved shapes. Holes were drilled to allow for future addition of support screws. All burrs and tool marks that resulted from cutting and drilling were removed or smoothed out with a metal file, mechanical grinder or by sanding. Remaining fragments were removed by washing with water. The surface of the PE panel was roughed by wet sanding with 220 grit paper until an overall chalk-like matte quality was achieved. The panel was then washed with a detergent and water and stored to dry.

The surface of a 4"×4" FC coated panel was dry sanded with 220 grit sand paper by hand until a uniform matte surface was achieved. The panel was further roughened and cleaned with Comet cleanser and a scouring pad. The resulting debris was rinsed off with water and set aside to dry.

EXAMPLE II.

Surface Preparation: Chemical Treatment

A PE panel was brushed with a mixture of phosphoric and chromic acids, sold under the trademark METAL TREAT by Klean Strip, Inc., and set aside overnight. The surface was washed with an ammonia based cleanser and water and then air dried. A matte finish was produced on the surface of the panel.

EXAMPLE III

Mixed Media on PE and FC

The following process was repeated on PE and FC panels measuring about 4"×4". A pencil drawing was applied and mistakes were removed with an eraser. Colored inks were sprayed over the drawing and erasers were used to create highlights. The panel was then brushed with an oil paint glaze, heated for 2 hours at 190° F. and removed to cool. (When a 4" by 4" panel was heated at a high temperature of 350° F. for about one hour, the polyethene core melted and spilled out 1/16" from the center of the panel allowing the aluminum sheets to curl slightly. After cooling, the support assumes this new concave configuration.)

EXAMPLE IV

Mixed Media on PE

A pastel drawing was applied to the prepared surface, mistakes were erased and thick chunks of pastel were dusted off. The pastel drawing was sealed with a spray mixture of acrylic emulsion in water and "PHOTO FLO" (a surfactant composition sold by Kodak of Rochester, N.Y.). The color was built up with acrylic emulsion paints by spray and brush. Highlights were added and mistakes were removed with an eraser. The panel was then heated for 2 hours at 190° F. and removed to cool. Additional oil paint glazes were brushed onto the surface to add luster. The panel was heated for a final time for 2 hours at 190° F. and removed to cool. An acrylic resin varnish was sprayed over the entire surface of the finished panel to protect the original painted art work.

EXAMPLE V

Tempera Paints on PE

Various pastels and pencils were applied to a roughened and cleaned PE panel surface. A tempera paint consisting of gelatin, pigment and water was sprayed to seal the drawing and to build up color. Erasers were used to create highlights. Oil paint glazes were brushed on to further seal the adhesive tempered paint and build up color. The panel was then heated for 2 hours at 190° F. and removed to cool. [(other adhesives can also be used to temper pigments)]

EXAMPLE VI

Mixed Media on PE

Oil pastels, water color pencils, and pastel chalks were blended onto a roughened and cleaned PE panel. Oil pastels were thinned with turpentine and in some areas smudged by hand. Water color pencils were blended on the panel by using a water dampened brush. Highlights were achieved by using erasers. Acrylic emulsion paints, watercolor paints, and tempered pigments (with an animal glue) were sprayed over the finished drawing. Egg tempera was applied in small areas. The panel was heated for 2 hours at 190° F. and removed to cool.

EXAMPLE VII

Mixed Media on PE

Oil paints, (artists' oil colors) were brushed onto the surface of a roughened and cleaned PE panel. The oil painting was heated for 2 hours at 190° F. and removed to cool. Additional oil paint was sprayed on with an airbrush. The wet oil paint spray was removed in areas with a semi-sharp tool to reveal the dry painted surface beneath. The finished panel was heated for a further 2 hours at 190° F. and removed to cool.

EXAMPLE VIII

Oil Paint as Primer on PE or FC

A white oil paint was applied over the entire surface of roughened and cleaned panels coated with PE and FC. The panels were heated for 2½ hours at 190° F. and removed to cool. A drawing was made using applied colored pencils and graphite pencils on each of the panels. Acrylic inks, acrylic emulsion paints, water color paints, and oil paints were brushed and/or sprayed onto the surfaces. Each time the panel was heated for about 2 hours at 190° F. and removed to cool.

EXAMPLE IX

Oil Paint as Primer on FC

Oil paint is applied to a roughened and cleaned fluorocarbon panel, baked for 2 hours at 190° F. and removed to cool. Watercolor paints, acrylic emulsion paints and oil paints are sprayed and/or brushed onto the oil paint primed surface. The panel is heated for about 2 hours at 190° F., then removed to cool. The paints bonded well to the oil primer coat that is applied to the roughened panel and heated.

EXAMPLE X

Acrylic Resin as Primer for PE and FC

A clear acrylic resin was wiped onto the surface of a roughened and cleaned panels coated with PE and FC and set aside to dry. Colored pencils and graphite drawings were applied. Each of the panels was heated for 2 hours at 190° F. and removed to cool. Additional varnish is applied to protect the original art from air born debris.

EXAMPLE XI

Pastels on PE (Chemically Treated)

Soft pastels were applied to the treated surface and flowed and blended well without being easily removed. Hard pastel drawing pencils left a slight incised line. Since pastels are loose pigment in a binding medium and not suspended in a paint film, the pastel drawing must be protected from future handling. The drawing was sealed with an oil+solvent spray, using safflower oil thinned with turpentine, heated for 2½ hours at 190° F., and removed to cool.

EXAMPLE XII

Felt Markers on PE

A drawing is applied the surface of a roughened and cleaned PE panel using a ball point pen and color is built up with felt tip ("CHART PAK") permanent markers. Linseed oil thinned with turpentine is sprayed on the panel and heated at 350° F. for about 30 minutes. The linseed oil flowed smoothly and evenly and could not be scratched off of the cooled panel surface.

EXAMPLE XIII

Etching a PE Surface

The surface of a light-colored PE panel is roughened using a dry sanding method described in Example I, above, and cleaned thoroughly. A drawing is etched into the roughened PE panel using a sharp metal tool. The panel is covered with a dark oil paint and the paint is worked into the etched areas. The oil paint is gently wiped off the surface of the panel and remains in the etched areas to enhance the etched drawing. The panel is heated for 2 hours at 190° F. and removed to cool; the paint remains in the grooves to provide the sharp contrast typical of conventional etchings.

EXAMPLE XIV

Applying Metal Foil

The surfaces of a PE and a FC panel are prepared with a chemical to roughen the surface. The surface is cleaned with an ammonia based cleaner and rinsed with water. An adhesive varnish (mordant) is applied to selected areas. Yellow ochre or other color pigment is optionally added to the adhesive as an undercoat for the gold. Gold leaf is carefully placed on the adhesive-coated areas and gently smoothed out with a dry cotton pad. The panel is placed in the oven for 2.5 hours at about 190° F. to permanently bond the foil and any pigment undercoat to the panel.

As will be understood by one accustomed to working with a variety of artists' materials, combinations of materials and techniques abound. The above examples are intended to be representative of the methods and articles of the invention, and not limiting of the scope of the invention, which is to be determined only by the claims which follow.

I claim:

1. A method of producing a finished permanent artistic work from one or more artists' materials, the method comprising the steps of:

a. providing a prefabricated metal composite substrate of the desired size, said substrate comprising two metal sheets bonded together by a thermoplastic core, said metal substrate having a cured non-porous polymeric surface coating that is not receptive to artists' materials, said polymeric surface coating being selected from the group consisting of polyester coatings and fluorocarbon coatings;

b. roughening the surface coating of the substrate to which the one or more artists' materials is to be applied to render the surface receptive to said artists' materials;

c. cleaning the roughened surface coating to remove dirt and oil;

d. applying the one or more artists' materials to the roughened surface coating using manual means, and optionally applying a sealant over said one or more artists' materials on said roughened surface coating;

e. heating the composite substrate to which the one or more artists' materials has been applied to a temperature which is less than the melting temperature of the thermoplastic core and maintaining the substrate at that temperature for a time that is sufficient to bond the one or more artists' materials, or when present the sealant covering said artists' materials, to the roughened surface coating; and f. cooling the composite substrate, wherein said finished work is dimensionally stable and wherein said artists' materials, or when present said sealant covering said artists' materials, are permanently bonded to the substrate.

2. The method of claim 1 where the metal composite substrate is comprised of two sheets of aluminum separated by the thermoplastic core.

3. The method of claim 1 where the surface coating is roughened by abrasive means.

4. The method of claim 1 where the surface coating is roughened by the application of a chemical etching agent.

5. The method of claim 1 in which the one or more artists' materials are selected from the group consisting of artists' oil paints, acrylic paints, epoxy and polyurethane paints.

6. The method of claim in which the sealant is selected from the group consisting of water-based acrylic materials and solvent-diluted drying oils.

7. The method of claim 6 which includes the further step of applying a metallic foil to the surface containing the one or more artists' materials prior to heating the substrate.

8. The method of claim 6 in which the one or more artists' materials are selected from the groups consisting of inks, water colors, charcoal, graphite, pastels and gouache.

9. The method of claim 1 in which the composite substrate is heated to a temperature in the range from 190° F. to about 350° F.

10. The method of claim 9 in which the substrate is heated for from about 30 minutes to about 3 hours.

11. An article formed by the method of claim 1.

\* \* \* \* \*